United States Patent [19]

Bowman

[11] Patent Number: 4,637,185

[45] Date of Patent: Jan. 20, 1987

[54] TRENCH DUCTS

[75] Inventor: Timothy S. Bowman, Parkersburg, W. Va.

[73] Assignee: Butler Manufacturing Company, Kansas City, Mo.

[21] Appl. No.: 621,957

[22] Filed: Jun. 18, 1984

[51] Int. Cl.⁴ .............................................. E04B 5/48
[52] U.S. Cl. ...................................... 52/221; 174/48; 174/49; 403/405.1; 220/3.4
[58] Field of Search ...................... 52/220, 221, 126.2, 52/396; 174/48, 49, 96, 98, 101; 220/3.4, 3.7, 3.8; 403/405, 406, 407

[56] References Cited

U.S. PATENT DOCUMENTS

| | | | |
|---|---|---|---|
| 3,204,378 | 9/1965 | Stessel et al. | 52/221 X |
| 3,593,472 | 7/1971 | Bargar | 52/221 |
| 3,701,837 | 10/1972 | Fork | 52/221 X |
| 3,886,702 | 6/1975 | Fork | 52/221 |
| 4,040,755 | 8/1977 | Jorgensen et al. | 52/221 X |
| 4,173,382 | 11/1979 | Booty | 174/48 X |
| 4,420,091 | 12/1983 | Thorpe et al. | 220/3.7 |

OTHER PUBLICATIONS

Walkerduct© Catalog, TD569, 1969.

Primary Examiner—William F. Pate, III
Assistant Examiner—Richard Chilcot
Attorney, Agent, or Firm—Frederick J. Olsson

[57] ABSTRACT

Trench ducts for electrical distribution systems having side walls constructed and mountable in a manner: (a) so that they can be snapped into position on the floor; (b) so that they can be shifted axially from the initial position; and (c) so that they can be pulled away from the installed position and be completely removed.

21 Claims, 12 Drawing Figures

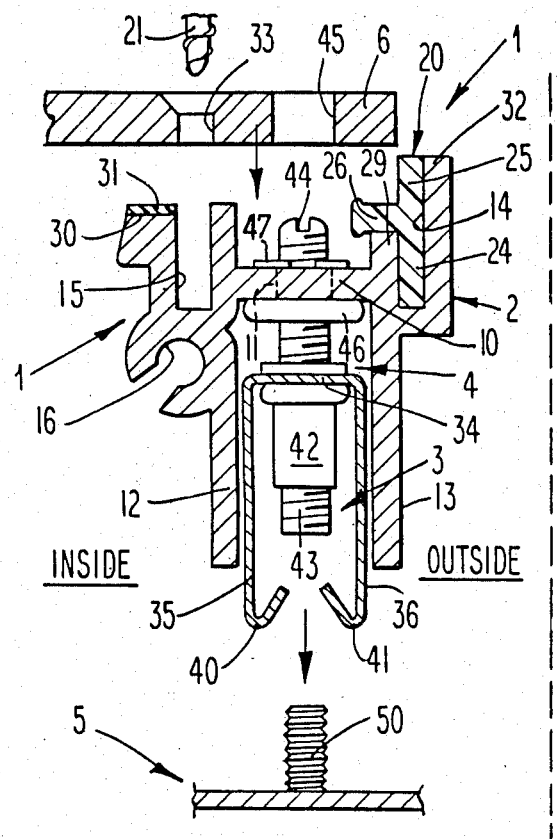
Fig. 4
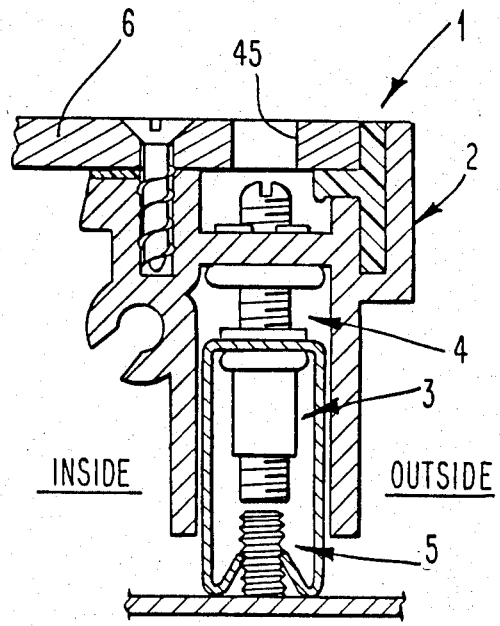
Fig. 5
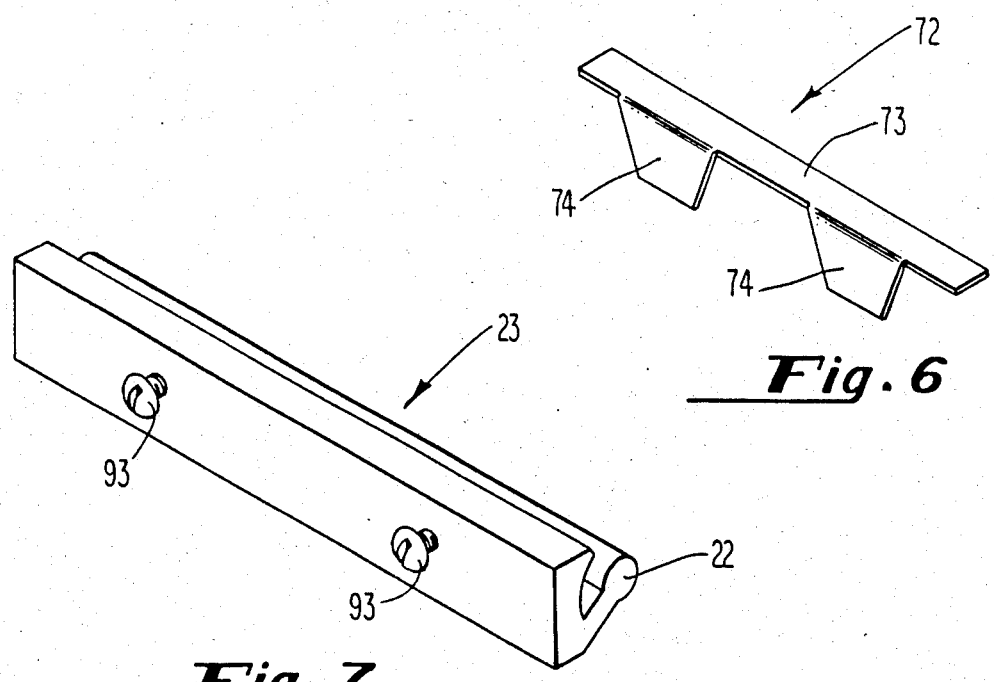
Fig. 6
Fig. 7

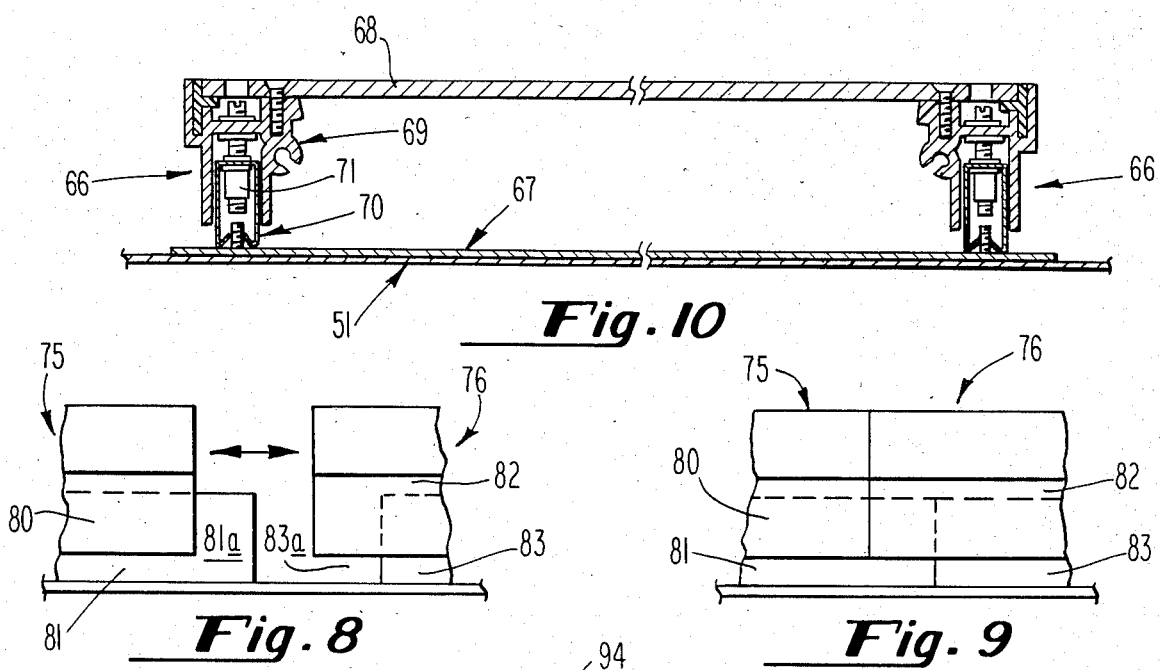
Fig. 10
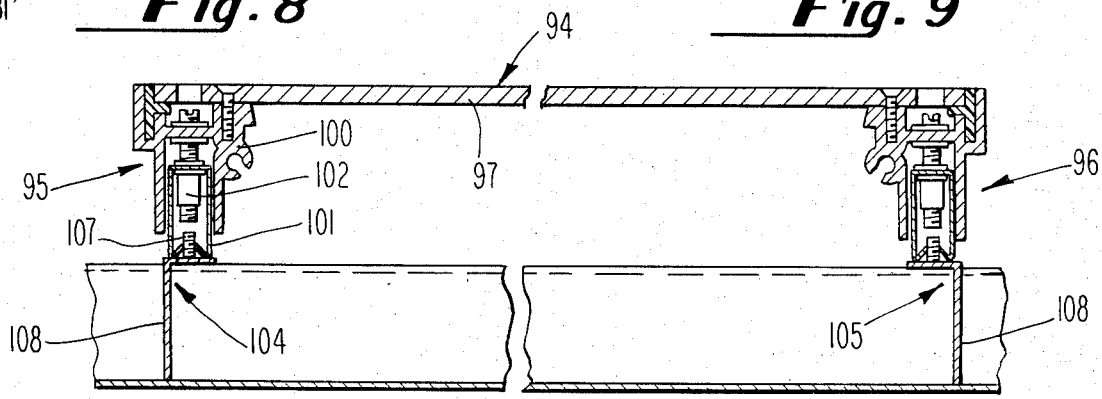
Fig. 8    Fig. 9
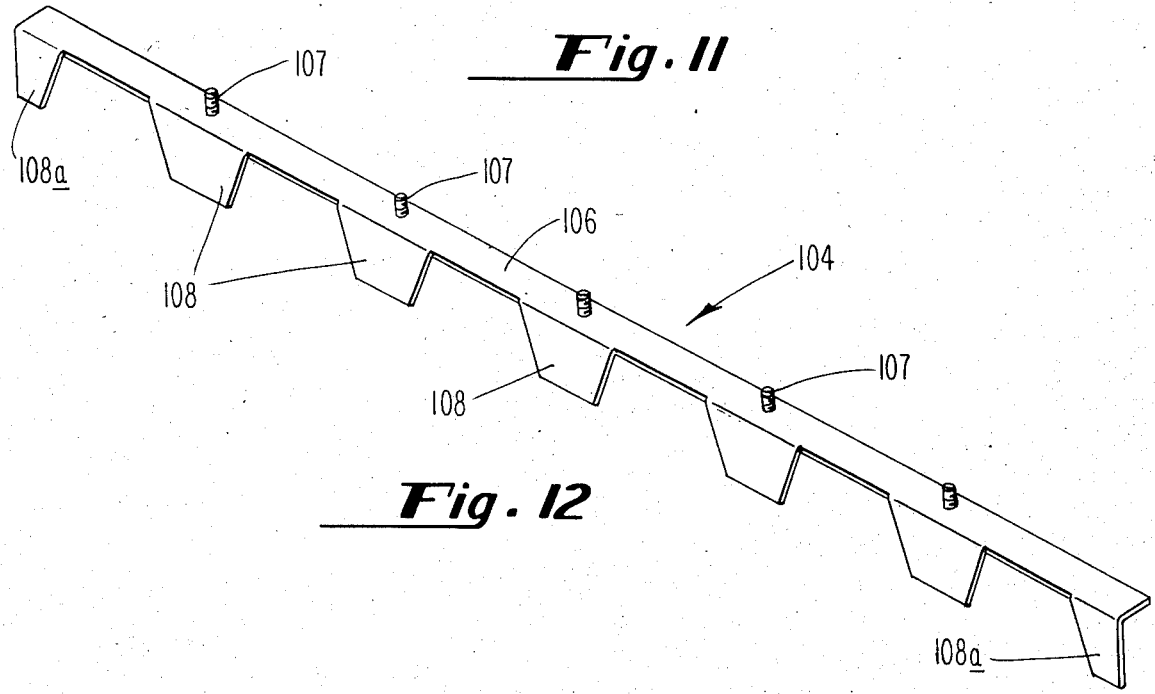
Fig. 11
Fig. 12

TRENCH DUCTS

This invention relates to underfloor electrical distribution systems for buildings and more particularly relates to improvements in trench ducts embedded in concrete floors wherein the subfloor is either metal or concrete.

The invention provides for substantial improvements in the common type of trench; i.e. full bottom trench, intermittent bottom trench, and in bottomless trench.

The invention involves the concept of having trench side walls constructed and mountable in a manner: (a) so that they can be snapped into position on the floor; (b) so that they can be shifted axially from the initial position; and (c) so that they can be pulled away from the installed position and completely removed.

Each side rail comprises upper and lower sections which are mountable to form a full bottom trench, to form an intermediate bottom trench, or to form a bottomless trench by being mounted on strips secured to the crests of the deck. The foregoing strips, the full bottoms, and the intermediate bottoms are referred to herein by the term "plate mechanism".

The invention provides several important advantages for the manufacturer, for the construction contractor, and for the building owner as will be noted from the following.

The invention provides that by a simple change in length of the side rails and in the number of covers and in the number of plate mechanisms, the manufacturer has the option of providing trench which is custom engineered and shipped to the job site fully assembled for installation, or trench which is fully assembled in a standard length and warehoused for sale off-the-shelf, or trench which is disassembled by that component parts are kept in inventory for sale off-the-shelf and assembled on the job and the additional option of providing any of the foregoing trench in full, intermittent, or bottomless configurations.

The above options, by using identical components (except for length of side rails), greatly reduces the tooling costs, the fabrication costs, and the inventory costs for the manufacturer. This enables the manufacturer to sell to contractors and building owners at prices lower than other wise would be possible.

For the construction contractor, the option is advantageous because he has the opportunity to bid on the full spectrum of job applications and to make changes and/or additions while a job is in progress and to do the latter with minimum lost time.

For example, the construction contractor can bid on jobs that require custom engineered trench where shortness of time is not a critical factor and bid on jobs where short time and material costs are critical because of the availability of off-the-shelf full-assembled trench and the availability of disassembled inventory either of which can be employed on a slab or metal cellular floor in full, intermittent, or bottomless configurations.

The trench of the invention has further advantage both to the building owner and to the contractor because of its adaptability for change during construction and to accomplish this without enormous costs which are commonly assiciated with construction changes. Where change is desired, the contractor is able to quickly adapt or accomodate changes such as additional runs on the same floor or different floors and changes requiring conversion from full bottom to intermittent bottom or vice-versa.

The trenches of the invention have added significance for the contractor and for building owner by the reduction in labor costs at installation. For example, on a metal subfloor, once the plate mechanism (strips) is secured to the deck the individual side rails or the side rail/cover assembly can be quickly snapped into place. This eliminates the necessity of two welding passes.

Once a side rail or a side rail/cover assembly is in position, the same can be tapped to move axially to insure tight abutment with an ajoining assembly. Moreover, when deck creep is cumulative and in an amount which must be compensated for during the installation, the same can be taken care of by that the end trench can be shifted axially with respect to the plate mechanism.

Furthermore, in buildings having trench of the invention installed on one or more floors and the end use of such a floor undergoes a radical change so that trench is no longer needed and it is desired to fill the trough or troughs in the floor, the covers and side rails can be removed and the trough filled. In certain instances, the removed side rails and covers can be put into inventory for reuse at a later date, for example, by owners who are in the business of constructing buildings and then leasing same and employ captive warehouses for building components.

The invention will be described below in connection with the following drawings wherein:

FIG. 4 is cross sectional, exploded elevational view of the side rail and plate mechanism of the invention;

FIG. 5 is a cross sectional view of the components of FIG. 4 assembled together;

FIG. 6 is a perspective view of a valley closure used with intermittent bottom trench;

FIG. 7 is a perspective view of a coupler used to couple or align abutting ends of adjacent side rails;

FIGS. 8 and 9 are respectively fragmentary elevational views illustrating the coupling or aligning of abutting ends of adjacent side rails without the use of a coupler such as shown in FIG. 7;

FIG. 10 is a cross sectional elevational view of an intermediate bottom or pan trench as taken along the lines 10—10 of FIG. 1;

FIG. 11 is a cross sectional elevational view of a bottomless trench of the invention; and FIG. 12 is a perspective view of plate mechanism for the bottomless trench of the invention.

Figure 1:
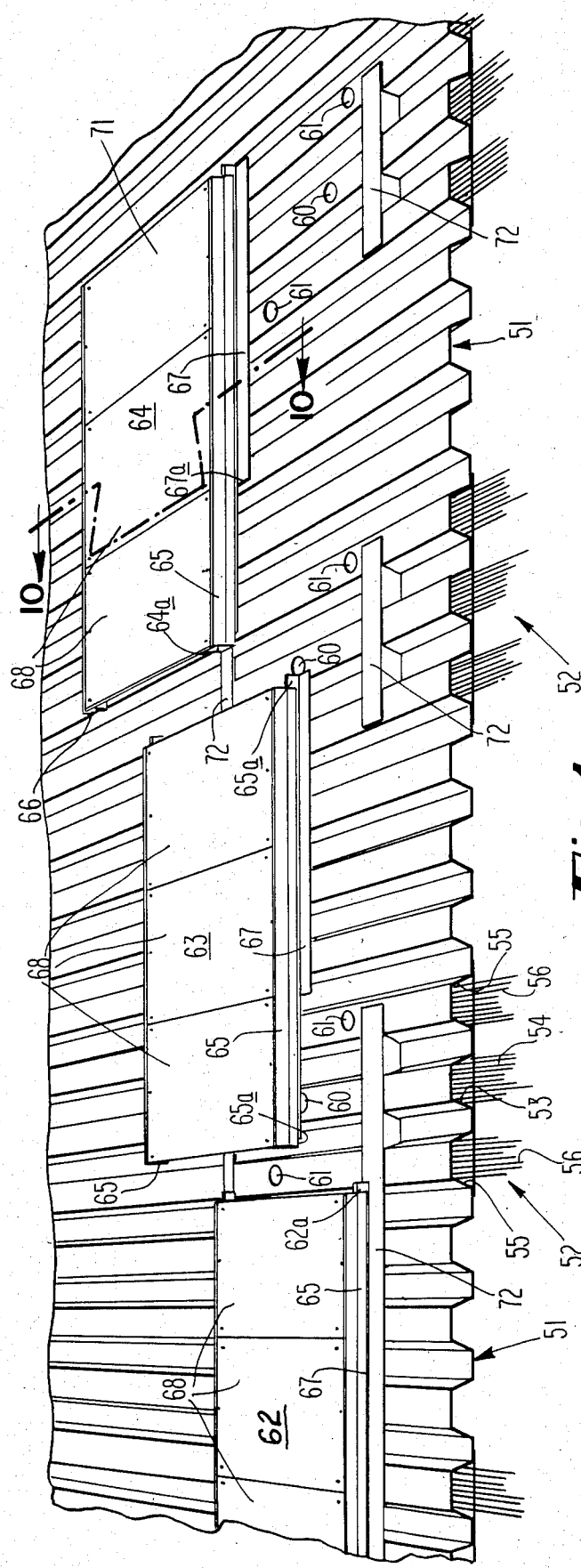
FIG. 1 is a perspective, exploded view illustrating the installation of intermittent bottom trenches of the invention on a metal subfloor having cellular raceways.

Before proceeding with the description, the conventional meaning or significance of various terms will be commented on.

It will be understood that the term "trench" as used herein is synonomous with the terms "trench duct" and "trench header" and similar descriptive names used in the trade. Also, it will be understood that the term metal subfloor is inclusive of both corrugated and cellular decking both of which, of course, have crests and valleys. Further, it is pointed out that the "bottom" of a trench is sometimes referred to in the trade as the "pan"

and full bottom trenches are sometimes called "pan trenches".

A full bottom or pan trench refers to a trench where the bottom is co-extensive with the length of the side rails and extends transversly between the side rails. Normally the bottom has three openings which align with corresponding openings in the crests of the power and communication ducts or cells in the cellular raceway.

An intermittent bottom trench is a pan trench where the bottom extends transversly between the side rails but does not extend the full length of the side rails. The effect of this is that the normal three access openings of the pan are thus enlarged to create a single opening which extends transversely between the side rails and lengthwise a distance equal to the cellular raceway. This opening provides access to openings in the crests of the power and communication ducts or cells of cellular raceway.

A bottomless trench is a pan trench wherein the three access openings have been infinitely enlarged; i.e. to extend between the side rails and for the full length of the side rails. The effect of this is to completely eliminate the bottom of the trench. The bottom is created by the crests of the subfloor and cellular raceway.

The drawings havein illustrate the trenches of the invention in connection with metal subfloors. In this regard it will be understood that all three types are employed over metal subfloors and that pan or full bottom trenches and bottomless trenches are also employed over concrete subfloors.

The nature of the full bottom, intermittent bottom, and bottomless trenches of the invention and the assembly of same either in the factory or in the field will readily be more appreciated by first describing the preferred structure of the side rails and the plate mechanism.

Referring to FIG. 4, the side rail 1 comprises an elongated upper section 2 and an elongated lower section 3 which are joined together by several spaced-apart adjusting mechanisms one of which is noted at 4. As seen in FIG. 4, the side rail 1 is directly mounted on the plate mechanism 5. The upper section 2 is preferably an aluminum extrusion and the lower section 3 is preferably fabricated from sheet metal. Extrusion and fabricating techniques are conventional.

A trench cover 6 is supported on top of the side rail. When mounted in a floor, the side rail extends horizontally and the cover is flush with the floor surface.

In the cross section shown in FIGS. 4 and 5, the area on the left hand side is on the inside of the trench and this is labelled "INSIDE" while the area on the right-hand side is on the outside of the trench and is labelled "OUTSIDE".

The horizontally extending upper section 2 has an upper bridge 10 having a plurality of clearance openings serially spaced along the same, one of which is indicated at 11. Extending down from the bridge are a pair of spaced apart upper legs 12 and 13. The upper section 2 is formed with three slots 14, 15, and 16. These slots respectively receive a reversible tile trim 20, a cover hold down screw 21, and a key arm 22 of a coupler 23 shown in FIG. 7.

The reversible tile trim 20 has oppositely directed arms 24 and 25 and an intermediate leg 26 normal thereto. The tile trim slot 14 is adapted to receive either of the arms 24 or 25 and in both cases the leg 26 engages the abutment 29 and serves as gasket means for the cover 6. Adajcent the cover hold-down slot 14 is an abutment 30 for a cover gasket 31. The gasket 31 is employed where additional edge support for the cover is desired.

When the arm 24 is in the slot 14, the arm 25 is flush with the egde 32 and the surface of the cover 6 and this adapts the trench for carpet floor covering. When the arm 25 is in the slot 14, the arm 24 extends above the top edge 32 and surface cover 6 and functions as a tile trim in tile types of floor covering.

The cover hold down screw 21 extends through a countersunk clearance opening 33 in the cover 6 and into the slot 15 when the threads self-tap into the walls of the slot. With respect to the coupler slot 16, this serves as a keyway for the key arm 22 when the coupler 23 is used to align abutting trenches as noted later on.

The horizontally extending lower section 3 has a lower bridge 34 which is disposed below the upper bridge 10 and extends parallel to same. Extending down from the lower bridge 34 are a pair of spaced apart lower legs 35 and 36 which are closely adjacent the upper legs 12 and 13. The lower leg 35 terminates in an inwardly extending bend 40 and the lower leg 36 terminates in an inwardly extending bend 41. The bends 40 and 41 face one another and form a connector or stud gripping means.

The lower bridge 34 carries a plurality of adjusting nuts which are serially spaced along the bidge one of which is indicated at 42. The nut shown in a conventional type called a RIV-NUT and has upset portions which secure the nut in position.

The adjusting nuts carry adjusting screws and the screw for the nut 42 being indicated at 43. These screws extend upwardly through the clearance holes 11 and at the top end are slotted at 44 to receive a turning tool inserted through access holes in the cover such as the access hole 45 for the screw 43. Each screw has a support flange such as the support flange 46 for the screw 43. Each support flange engages the underside of the upper bridge 10 and thereby supports the upper section 2 on the lower section 3.

The upper bridge 10 is held firm against the support flange by the conventional keyhole spring clips such as the clip 47 which fits into peripheral slots in the screw and bear on the top of the bridge 10.

As will be apparent, the upper section 1 can be moved vertically with respect to the lower section as by turning the adjusting screws. The adjacent provision, of course, is for moving the upper section 2 just after the power to bring the top edge 32 flush with the floor surface.

Referring now to the plate mechanism 5, this is essentially flat, elongated, and in plan is rectangular in shape and includes a plurality of serially arranged studs 50 which extend vertically upwardly. The studs are attached by conventional stud welding apparatus.

The studs are adapted to be received between the bends 40 and 41 which yieldably grip the same. Thus, the studs form connecting means which cooperate with the connector means of the side rails. For assembly purposes, whether in the factory or in the field, the preferable technique is to push the side rail down onto the plate mechanism to effect the engagement between bends 40 and 41 and the studs 50.

The plate mechanism takes several forms depending upon the type of trench.

In a full bottom or pan trench, the plate mechanism is rectangular in shape and is coextensive with the length of the side rail and extends between the side rails and slightly beyond same to provide space for securing the plate mechanism to the crests of the subfloor or to be anchored to a concrete subfloor. The studs on the plate mechanism are arranged as by two sets, one set serially spaced adjacent one edge of the plate mechanism and the other set serially spaced adjacent the opposite edge of the plate.

When the trench is the intermittent bottom type, the plate mechanism is also rectangular in shape and is partly coextensive with the length of the side rails and extends between and slightly outside the side rails similarly as the pan trenches. By being partially coextensive with the side rails, a single enlarged opening is created over the cellular raceway for use in accessing the openings in the power and communication ducts therein. The studs on the plate mechanism are arranged similarly in the pan or full bottom trench.

In a bottomless trench, the plate mechanism takes the forms of two narrow rectangular shaped strips respectively under the side rails and extending coextensive therewith. Each strip has a plurality of studs serially spaced along the strips. Each strip is adapted to be secured to the crests of a metal subfloor or anchored to a concrete subfloor and in the former case is provided with flanges which extend into the valleys and prevent entry of concrete to the trench during the pour.

Returning now to the connector means of the side rails and the connector means of the plate mechanism, the advantage of the connector structure will now be commented on.

First, the side rail and plate mechanism can be assembled as by relatively moving the rail and stud in a direction normal to the axis of the stud. For example, as noted heretofore by pushing the rail down on the plate mechanism which is made possible by the bends 40 and 41 sliding down over the studs 50. It will be understood, of course, that where an assembly of covers and side rails is to be placed on the plate mechanism, the side rails are simultaneously moved down ove the respective studs.

Second, when the side rail is mounted on the plate mechanism, the side rail and plate mechanism can be relatively moved in a direction along the axis of the side rail, for example, if the plate mechanism is fixed on a subfloor either end of the side rail can be tapped to nudge the rail along the studs. An assembly of side rails and covers can be axially moved by placing a block over the end of the trench and tapping the center of the block.

Thirdly, the side rail and plate mechanism can be separated by relatively moving the rail and plate mechanism apart, for example, if the plate mechanism is fixed on a subfloor, the side rail is pryed with the upward motion being accomodated by the bends 40 and 41 sliding upwardly along the studs.

In connection with FIGS. 4 and 5, we have illustrated, for descriptive purposes, the openings 33 and 45 as being side by side. Usually, in a trench cover these openings would be spaced apart by that the openings 45 for adjusting screws are located centrally of the cover and the openings 45 for hold down screws are located at the corners of the covers.

With the above in mind, the various forms of the trench will now be commented on.

Referring to FIG. 1, a typical subfloor comprises corrugated decking 51 and cellular raceways 52 which are blended together in the usual manner. The cellular raceways 52 have power raceway or cell 53, carry power conductors 54, and on opposite sides have telephone or other communication raceways 55 and carrying cables 56. In each cellular raceway, access to power raceway 53 is provided by the access opening 60 and access to the telephone raceways 55 is provided by the access openings 61.

The power conductors and communication cables in the cellular raceways are serviced by intermittent bottom trenches, three of which are illustrated at 62, 63, and 64. The trench 62 is installed on the subfloor when the trenches 63 and 64 are above the floor ready for installation.

The trenches 62, 63, and 64 are the custom engineered kind being shipped to the job site fully assembled and ready for installation. The trenches 62, 63, and 64 as shown are identical in construction having side rial, cover, and plate mechanism components as previously described. Thus, the trench 64 has side rails 65 and 66 mounted on plate mechanism 67. Covers 68 are supported on the side rails. The same numbers as on trench 64 have been applied to the corresponding parts of the trenches 62 and 63.

It will be observed that the plate mechanism 67 extends only partially along the length of the side rails so as to create a large opening. This opening extends from the edge 67a of the plate mechanism to the left hand end of the trench and also extends between the two side rails 65 and 66. The length of the opening is commensurate with the width of the cellular raceway.

Referring to FIG. 10, the side rail 65 of trench 64 has the upper section 69 and lower section 70 joined together by adjusting means 71 which are identical in construction to the upper section 2, lower section 3, and adjusting means 3 previously described. The side rail 66 is similarly constructed. The plate mechanism 67 is same as previously described.

It will be observed that the plate mechanism 67 extends between the side rails and slightly outwardly thereof so as to provide area for securing the plate mechanism to the crests of the decking 51.

Due to the opening over the cellular raceway, it is necessary to provide means to prevent the entry of wet concrete into the trench during the pour. Thus, a pair of closure means 72 are provided which are disposed underneath the opposite side rails and along the enlarged opening. An enlarged view of the closure is shown in FIG. 6. Each closure includes a narrow top strip 73 supported on the crests of the raceway and flanges 74 which extend down into the valleys of the raceway.

The typical procedure for installing a plurality of trenches such as 62, 63, etc. is commented on below.

First, chalk lines are put down along the crests of the subfloor along the trench run and then pairs of closure means 72 are installed on the cellular raceways usually by tack welding.

The first intermittent trench, say the trench 62, is set down on the subfloor. This trench may, for example, be adjacent a wall having feeder arrangement such as a vertical riser. The plate mechanism is then secured by self-tapping screws in the decking portion or by tack-welding in the crests. The next trench, such as trench 63, is then put into position. This is done a just described.

For lining up the side rails of the trench 63 with the side rails of the trench 62 an arrangement other than the use of a coupling (FIG. 7) is employed. This is done by off-setting the lower section of the side rail with respect to the upper section of the side rail which permits the outboard end of the lower section on one trench to fill the void created by shifting of the lower section of the adjacent trench. The foregoing will be explained in connection with FIGS. 8 and 9.

In FIGS. 8 and 9 the left hand trench has side rail 75 and the right hand trench has side rail 76. The side rail 75 comprises the upper section 80 and lower section 81 while the side rail 76 comprises the upper section 82 and lower section 83.

In the left hand trench, the lower section 81 is off-set to the right with respect to the upper section 80 so that the lower section has an outboard part 81a. In the right hand trench, the lower section 83 has also been shifted to the right with respect to the upper section 82 and this shifting creates an inboard space 83a which is of the same axial length as the outboard portion 81a.

It will be evident that when the trenches are moved as noted in FIG. 9, the outboard end 81a will occupy the inboard space 83a. This aligns the abutting side rails. The same takes place on the opposite side of the trench for the two adjacent side rails.

Returning now to FIG. 1, after the trench 63 has been placed down on the subfloor, the same is nudged to the left so that the outboard section of the side rails of trench 62 fit into the inboard space of the side rails of trench 63. When the trench 63 is fully positioned, the plate mechanism is secured to the subfloor as by self-tapping screws or spot welds. The same procedure is applied to the trench 64, etc., etc.

The trenches 62, 63, and 64 are shown with three covers. Additional covers are employed for longer length trenches, such as full bottom trench 84. In general, the length and number of covers depends on the width and the spacing between the raceway 52.

The trench 84 is of the type which is fully assembled at the factory and shipped to the job already for installation. The trench 84 includes the side rails 85 and 86, the covers 90, and plate mechanism 91. These components have the same construction as corresponding components described in connection with FIGS. 1, 3, and 4. A cross section through the trench of FIG. 2, when mounted on a metal subfloor and taken on the lines 92 would produce a cross section identical to that of FIG. 10.

Figure 2:
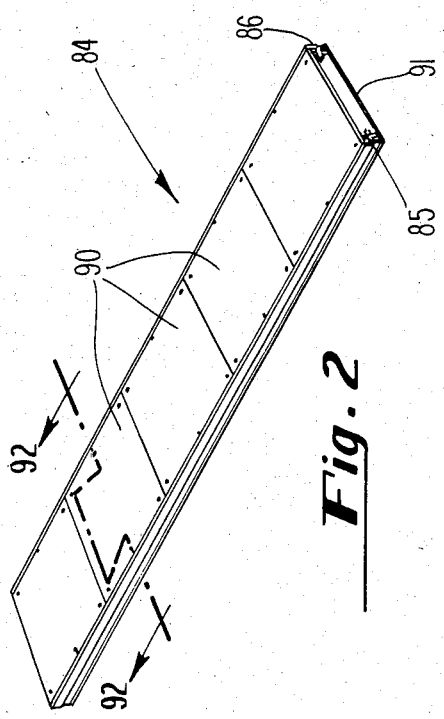
FIG. 2 is a perspective view of an assembled, full bottom pan trench of the invention.

Abutting trenches of the kind shown in FIG. 2 usually are aligned by means of the coupler 23 of FIG. 7. This is done by removing the end cover of the trench secured to the subfloor and then fully inserting the key arm 22 of a coupler into the slot 16 in each of the side rails. The next trench, with its end cover removed, is brought into abutting position and the installed couplers shifted so that the key arms are inserted into the side rail slots. The screws 93 are then tightened up. Additional screws may be employed if desired.

The bottomless trench employs the same kind of cover and side rails as described heretofore. The plate mechanism differs in that it does not extend between the side rails. With this in mind we will now comment on the bottomless trench.

Referring to FIG. 11, the bottomless trench 94 includes the side rails 95 and 96 and cover 97. The side rail 95 has the upper section 100 and lower section 101 joined together by adjusting mechanism 102. The components are the same as described in connection with FIGS. 1, 4, and 5.

The plate mechanism 103 comprises two strips like elements 104 and 105 respectively disposed under the side rails 95 and 96. The element 104 is shown in FIG. 12 and includes the elongated narrow top 106 carrying the studs 107 and extending down from the top 106 are the flanges 108.

For installation purposes on a metal subfloor, the plate mechanism; i.e. strips 104 and 105 are placed down on a subfloor so that an adjacent pair of the flanges 108 occupy the valleys of a cellular raceway similarly as described for the flange 74 of closure 72 of FIG. 6. The remaining flanges 108 occupy the valleys in the decking or another cellular raceway. It will be noted that the end flanges 108a are half-size. This is done so that the two adjacent half-size end flanges will fully occupy a valley.

The length of the strips 104 and 105 member of flange 108 and the number of flanges will depend on the particular length of side rails.

With respect to mounting the pan and bottomless trenches on a concrete subfloor, this is accomplished by supporting the plate mechanism on the usual leveling and/or securing deviced employed for conventional pan and bottomless trench.

From the foregoing description, it will now be readily apparent that, as mentioned heretofore, the structure of the components permits factory or on-the-job installation and the option as to type of trench simply by choice of dimensions.

Figure 3:
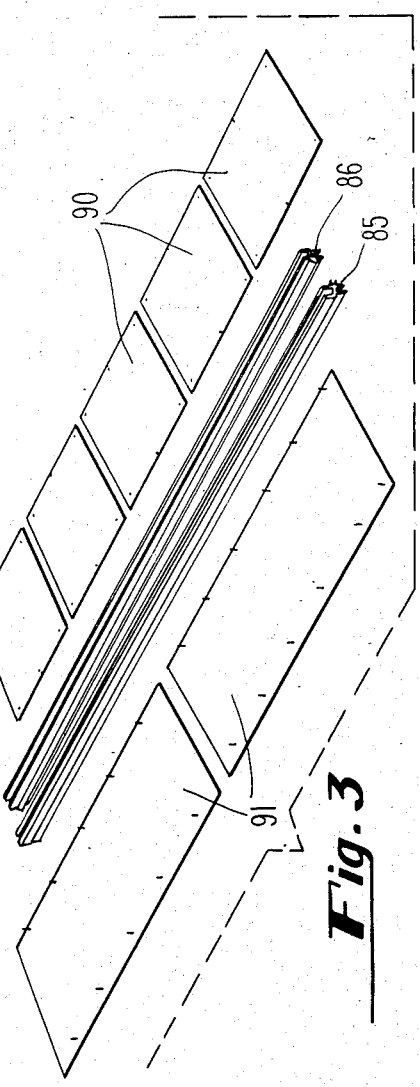
FIG. 3 is a view illustrating component parts selected from a warehouse inventory to be assembled into the trench of FIG. 2.

By way of example, FIG. 8 illustrates an inventory of parts of FIG. 3 for factory assembly or field assembly of the pan trench of FIG. 2. (In FIG. 3 the corresponding parts have the same number.) This inventory normally would include side rail and plate mechanism components for intermittent and bottomless trench.

As previously mentioned, the structure of the side rails and plate mechanism permits removal of the trench when presence of same is no longer desired in a floor.

We have already discussed the fact that the side rails can be separated from the plate mechanism. Further, in this regard, note with reference to FIGS. 4 and 5 that the design avoids any outside proturbance which might lock into the concrete and prevent removal.

For removal purposes, the covers are taken off and then a tool inserted between the concrete and each side rail to be sure the rail is free from the concrete. Each side rail is then pryed up and away from the plate mechanism.

I claim:

1. A side rail for use in a trench duct wherein the side rail extends horizontally:
   an elongated upper section comprising a horizontally extending upper bridge having a plurality of clearance openings serially spaced therealong, a pair of spaced apart upper legs extending downwardly from the upper bridge, and means to support a trench duct cover above the upper bridge;
   an elongated lower section comprising a horizontally extending lower bridge disposed below said upper bridge, a pair of spaced apart lower legs extending downwardly respectively adjacent said upper legs and each terminating by an inwardly extending bend with the bends facing one another and forming a stud gripping means;
   a plurality of adjusting nuts connected to and serially spaced along said lower bridge;
   a plurality of adjusting screws respectively disposed in said adjusting nuts and extending upwardly through said clearance openings, each screw having a slot in the upper end to receive a turning tool and having a support flange engaging the under side of said upper bridge to thereby support said upper section; and for at least some of said screws, means holding the upper bridge firm against said support flange.

2. The side rail of claim 1 further including a T-shaped reversible tile trim having a pair of oppositely directed arms and a leg normal thereto and wherein said means to support a trench duct cover above the upper bridge comprises:

means forming a first slot for use in receiving, alternatively, either arm of said tile trim, an abutment to engage the leg of the tile trim when either arm is in the first slot and serving as a gasket means to be engaged by the trench duct cover; and means forming a second slot to receive cover hold-down screws.

3. The side rail of claim 2 further including means disposed below said second slot and forming a third slot for receiving a coupling.

4. For a trench duct to be mounted over a subfloor:

an elongated side rail having a lower end and first connector means adjacent the lower end;

plate mechanism to be secured to said subfloor and having a second connector means, the first and second connector means having means providing for the first and second connector means to slidings engage;

when said plate mechanism is secured to said subfloor and the first and second connector means are slidingly engaged, said engagement of said first and second connector means being operative to provide alternatively:

(a) for the side rail to be moved axially by that the first connector means slides on the second connector means whereby the side rail is repositioned over said subfloor; and (b) for the side rail to be removed from the plate mechanism by that the first connector means is slidable upwardly on and disengagable from the second connector means.

5. For a trench duct to be mounted over a metal subfloor having crests and valleys and including a cellular raceway having crests and valleys:

an elongated side rail having a lower end and first connector means adjacent the lower end;

plate mechanism to be secured at least to the crests of said metal subfloor and having second connector means, the first and second connector means having means providing for the first and second connector means to slidingly engage;

when said plate mechanism is secured to the crests of said metal subfloor and the first and second connector means are slidingly engaged, said engagement of said first and second connector means being operatively to provide alternatively:

(a) for the side rail to be moved so that the first connector means engages with and slides on the second connector means whereby the side rail is mounted on said plate mechanism and thereby positioned on said crests;

(b) for the side rail to be moved axially by that the first connector means slides on the second connector means whereby the side rail is re-positioned over said crests; and (c) for the side rail to be removed from the plate mechanism by that the first connector means is slideable upwardly on and disengagable from the second connector means.

6. The construction of claim 5 wherein:

there are a pair of said side rails and said plate mechanism is dimensioned to extend between and co-extensive with said side rail and form the full bottom pan of a pan trench duct.

7. The construction of claim 5 wherein:

there are a pair of said side rails and said plate mechanism is dimensioned to extend between and partially co-extensive with said side rails and form the bottom pan of an intermittent bottom trench duct.

8. The construction of claim 5 wherein: there are a pair of said side rails and said plate mechanism comprises a pair of narrow strips respectively disposed under said side rails for use in forming a bottomless trench duct, each strip having flange means for use in closing off said valleys of the metal sub-floor and said valleys of said cellular raceway.

9. The construction of claim 5 wherein:

said side rail comprises an upper section, a lower section, and adjusting means mounting the upper section on the lower section for vertically moving the upper section with respect to the lower section, said upper section having means to mount trench duct cover means and said lower section mounting said first connector means which includes yieldable cripping means for use in gripping stud means; and second connector means includes a plurality of studs extending upwardly from the plate mechanism, the studs having exterior mean to be engaged by said yieldable gripping means.

10. In a trench duct:

first and second elongated spaced-apart side rails, a plurality of covers and plate mechanism for mounting the trench over a subfloor;

each said side rail comprising an upper section having means mounting said covers, a lower section, and adjusting mean mounting the upper section on the lower section for vertically moving the upper section with respect to the lower section and said lower section including yieldable gripping means for use in gripping stud means;

said plate mechanism extending between said side rails to constitute the bottom of the trench;

said plate mechanism having a first plurality of serially arranged stud means adjacent one edge thereof and extending upwardly therefrom and each stud means being respectively engaged by said yieldable gripping means on said first side rail; and said plate mechanism also having a second plurality of serially arranged stud means adjacent an edge opposite said one edge and extending upwardly therefrom and each stud means being respectively engaged by said yieldable gripping means on said second side rail.

11. In a trench duct:

first and second elongated spaced-apart side rails, a plurality of covers and an elongated, rectangular-shaped plate mechanism for mounting the trench over a subfloor;

each said side rail comprising an upper section having means mounting said covers, a lower section, and adjusting means mounting the upper section on the lower section for vertically moving the upper section with respect to the lower section;

first gripping means on said lower section;

second gripping means on said plate mechanism, the first and second gripping means engaging one another and securing the side rails on the plate mechanims; and the respective structures of said first and second gripping means providing for said side rails and covers to be moved axially by that the first gripping means is slideable on the second gripping means whereby when said plate mechanism is mounted on said subfloor, said side rails and covers may be repositioned over said subfloor.

12. The trench of claim 11 wherein:

the respective structures of said first and second gripping means also providing, when said plate mechanism secured to said subfloor and said covers are removed, for said side rails to be removed from said plate mechanism by that the first gripping means is slideable upwardly on and disengagable from the second gripping means.

13. An intermittent bottom trench duct comprising:

first and second elongated spaced apart side rails, a plurality of covers and an elongated, rectangular-shaped plate mechanism for mounting the trench over a subfloor which includes a cellular raceway having crests and valleys;

each said side rail comprising an upper section having means mounting said covers, a lower section, and adjusting means mounting the upper section on the lower section fom vertically moving the upper section with respect to the lower section and said lower section including yieldable gripping means for use in gripping stud means;

said plate mechanism extending between said side rails and partially co-extensive therewith to thereby constitute a partial bottom for the trench and form an enlarged opening for use, when the trench is mounted on said subfloor, in permitting conductors to pass as between cells of said cellular raceway and the interior of the trench;

said plate mechanism having a first plurality of serially arranged stud means adjacent one edge thereof and extending upwardly therefrom and each stud means being respectively engaged by said yieldable gripping means on said first side rail; and said plate mechanism also having a second plurality of serially arranged stud means adjacent an edge opposite said one edge and extending upwardly therefrom and each stud means being respectively engaged by said yieldable gripping means on said second side rail.

14. An intermittent bottom trench duct:

first and second elongated spaced apart side rails, a plurality of covers and an elongated, rectangular shaped plate mechanism for mounting the trench over a subfloor which includes a cellular raceway having crests and valleys;

each said side rail comprising an upper section having means mounting said covers, a lower section and adjusting means mounting the upper section on the lower section for vertically moving the upper section with respect to the lower section;

first gripping means on said lower section;

said plate mechanism extending between said side rails and partially co-extensive therewith to thereby constitute a partial bottom for the trench and form an enlarged opening for use when the trench is mounted on said subfloor, in permitting conductors to pass as between cells of said cellular raceway and the interior of the trench;

second gripping means on said plate mechanism, the first and second gripping means engaging one another and securing the side rails on the plate mechanism; and the respective structures of said first and second gripping means providing for said side rails and covers to be moved axially by that the first gripping means is slideable on the second gripping means whereby when said plate mechanism is mounted on said subfloor, said side rails and covers may be repositioned over said subfloor.

15. The trench duct of claim 14 wherein:

the respective structures of said first and second gripping means also providing, when said plate mechanism is secured to said subfloor and said covers are removed, for said side rails to be removed from said plate mechanism by that the first gripping means is slidable upwardly on and disengagable from the second gripping means.

16. The trench of claim 13, or claim 14, or claim 15 further including:

a pair of closure means each having downwardly extending flanges and being for use, when the trench is mounted on said subfloor, to be respectively conncected to said subfloor underneath said side rails and extend along said enlarged opening with said flanges extending into said valleys of said cellular raceway and engage the same to prevent concrete from entering.

17. The combination of a trench duct and a metal subfloor having crests and valleys and which includes a cellular raceway having crests and valleys, said combination comprising:

first and second elongated spaced apart side rails, a plurality of covers, and plate mechanism mounting the trench over the crests of said metal subfloor and over the crests of said cellular raceway;

each said side rail comprising an upper section having means mounting said covers, a lower section, and adjusting means mounting the upper section on the lower section for vertically moving the upper section with respect to the lower section and said lower section including yieldable gripping means for use in gripping stud means;

said plate mechansim being formed as by first and second elongated strips fixed to the crests of said metal subfloor and spaced from one another whereby the crests and valleys of the metal subfloor and of the cellular raceway between said strips are uncovered;

a plurality of serially arranged first stud means extending upwardly from said first elongated strip and each first stud means being respectively engaged by said yieldable gripping means on said first side rail; and a plurality of serially arranged second stud means extending upwardly from said second elongated strip and each second stud means being respectively enaged by said yieldable gripping means on said second side rail.

18. The combination of a trench duct and a metal subfloor having crests and valleys and which includes a cellular raceway having crests and valleys, said combination comprising:

first and second elongated spaced apart side rails, a plurality of covers, and plate mechanism mounting the trench over the crests of said metal subfloor and over the crests of said cellular raceway;

each said side rail comprising an upper section having means mounting said covers, a lower section, and adjusting means mounting the upper section on the lower section for vertically moving the upper section with respect to the lower section;

on each said side rail, first gripping means on the lower section thereof;

said plate mechanism being formed as by first and second elongated strips fixed to the crests of said metal subfloor and spaced from one another whereby the crests and valleys of the metal subfloor and cellular raceway between the strips are exposed;

second gripping means on each of said strips, the respective first and second gripping means engaging one another and securing the respective side rails on the strips; and the respective structures of said first and second gripping means providing for said side rails and covers to be moved axially by that the first gripping is slideable on the second gripping means whereby the the side rails and covers may be repositioned over said subfloor.

19. The trench of claim 18 wherein the respective structures of said first and second gripping means also providing, when said covers are removed, for said side rails to be removed from said strips by that the first gripping means is slideable upwardly on and disengagable from the second gripping means.

20. The trench of claim 17, or claim 18, or claim 19 further including:

on each said strip downwardly extending flanges extending into valleys of said metal subfloor and said cellular raceway and engaging the same to prevent concrete from entering the trench.

21. The combination of a trench duct and a metal subfloor having crests and valleys comprising:

first and second elongated spaced-apart side rails, a plurality of covers and an elongated, rectangular shaped plate mechanism mounting the trench over said subfloor on crests and valleys thereof;

each said side rail comprising an upper section having means mounting said covers, a lower section, and adjusting means mounting the upper section on the lower section for vertically moving the upper section with respect to the lower section;

first gripping means on said lower section;

said plate mechanism being formed as by first and second elongated strips fixed to the crests and valleys of said subfloor and spaced from one another whereby the subfloor is uncovered each strip having downwardly extending flanges extending into valleys of said subfloor and engaging the valleys to prevent concrete from entering the trench;

second gripping means on said plate mechanism, the first and second gripping means engaging one another and securing the side rails on the plate mechanism;

the respective structures of said first and second gripping means providing for said side rails and covers to be moved axially by that the first gripping means is slideable on the second gripping means whereby the trench is repositioned over said subfloor; and the respective structures of said first and second gripping means also providing, when said covers are removed, for said side rails to be removed from said plate mechanism by that the first gripping means is slideable upwardly on and disengagable from the second gripping means.

* * * * *